United States Patent [19]

Cascino

[11] Patent Number: 4,921,739

[45] Date of Patent: May 1, 1990

[54] SELF-ADHERENT FOAM STRIP

[75] Inventor: Lawrence A. Cascino, South Bend, Ind.

[73] Assignee: Gaska Tape, Inc., Elkhart, Ind.

[21] Appl. No.: 434,446

[22] Filed: Nov. 13, 1989

[51] Int. Cl.[5] .................. B32B 7/04

[52] U.S. Cl. .................. 428/40; 428/36.5; 428/317.1; 428/409

[58] Field of Search .................. 428/36.5, 40, 317.1, 428/409

[56] References Cited

U.S. PATENT DOCUMENTS

| | | | |
|---|---|---|---|
| 3,540,977 | 11/1970 | Schickedanz | 428/409 |
| 4,540,611 | 9/1985 | Henderson | 428/36.5 |
| 4,585,679 | 4/1986 | Karabedian | 428/36.5 |
| 4,806,404 | 2/1989 | Cascino | 428/40 |

*Primary Examiner*—William J. Van Balen
*Attorney, Agent, or Firm*—Thomas J. Dodd

[57] ABSTRACT

A foam strip which adheres to the surface of glass and other smooth objects to enhance gripping. The foam is formed from a highly plasticized foamable resin cast on the glossy surface of a release liner to enhance adhesive properties.

4 Claims, 1 Drawing Sheet

SELF-ADHERENT FOAM STRIP

SUMMARY OF THE INVENTION

This invention relates to foam strips and will have application to foam strips which adhere to glass and similar smooth surfaces without a separative adhesive.

Laboratory equipment is notoriously difficult to handle due to the smooth surface of glass. Such equipment is also very expensive. The foam strip of this invention is formed of a self-adherent PVC foam which has excess plasticizer incorporated therein. The foam is cast on a glossy surface release liner which further enhances the self-adherent properties of the strip.

Accordingly, it is an object of this invention to provide for a self-adherent foam strip.

Another object is to provide for a foam strip which adheres to glass and other smooth surfaces without a separate adhesive.

Another object is to provide a foam strip for gripping laboratory equipment.

Other objects will become apparent upon a reading of the folowing description.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use so that others skilled in the art might utilize its teachings.

Figure 1:
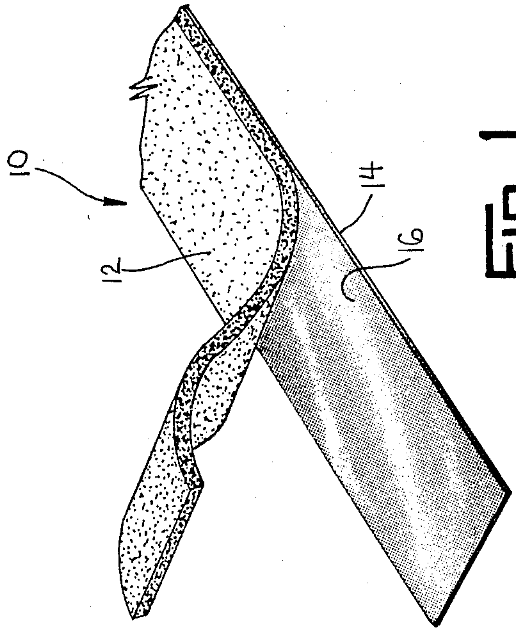
FIG. 1 is a perspective view of the foam strip of this invention shown being removed from its release liner.

Referring to FIG. 1, reference numeral 10 refers generally to the foam tape strip of this invention. Strip 10 includes a single layer 12 of a foamed resin, such as PVC, polyurethane, or the like. Layer 12 is cast on a release liner 14 which has at least one smooth glossy surface 16. Layer 12 is generally formed by mixing the resin with an amount of plasticizer in excess of the amount needed to soften the resin. Layer 12 is then cast directly onto glossy surface 16 of release liner 14, which prevents bleeding of the plasticizer and allows foam layer to be unwound without adhering to itself.

Figure 2:
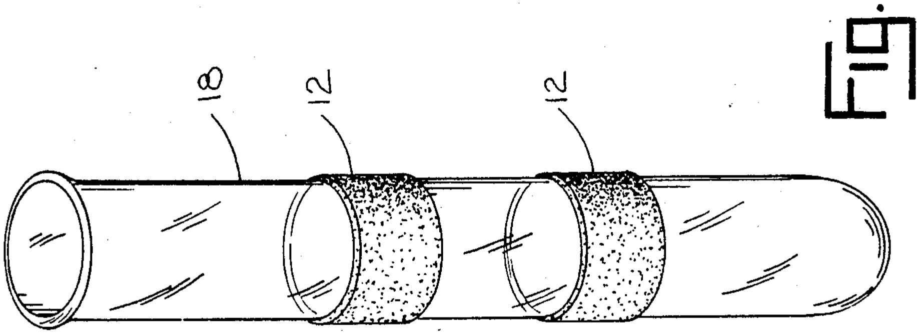
FIG. 2 is a perspective view of the strip in use on a laboratory test tube.

FIG. 2 illustrates one of many possible applications of foam strip 10. After layer 12 is removed from release liner 14 and cut to size, layer 12 is wrapped around test tube 18 with the layer adhering to the smooth outer surface of the test tube. This adherence facilitates gripping of the tube 18 by hand or with conventional gripping tools such as tongs (not shown). Layer 12 also cushions tube 18 against breakage when dropped.

The following example is indicative of the process and materials used in forming strip 10.

EXAMPLE

The following compounds were combined to form a homogenous mixture:

| | |
|---|---|
| Foamable PVC resin | 100 parts by weight |
| Phthalate plasticizer | 140 parts by weight |
| Blowing agent plasticizer blend | 14.4 parts by weight |
| Activator stabilizer | 1.5 parts by weight |
| Cell stabilizer | 1.0 parts by weight |

The above materials are disclosed in my U.S. Pat. No. 4,806,404, incorporated herein by reference. The mixture was cast at a height of 0.025 inches on the glossy side of a heavy density release liner and expanded by heating to 385° F. After the strip was allowed to cool, a six inch strip was cut and the foam tape peeled from the release liner and wrapped about a test tube. The tape adhered to the smooth surface of the tube until peeled off.

It is understood that the invention is not limited by the above details, but may be modified within the scope of the following claims.

I claim:

1. A foam strip for positioning about a smooth surfaced object, said strip comprising a unitary tackified layer formed of a foamable resin having quantities of plasticizer incorporated therein which exceed the minimum amount of plasticizer required to soften the resin, said tackified layer cast on a glossy surface of a release liner wherein the tackified layer adheres to a smooth surfaced object without a separate adhesive.

2. The foam strip of claim 1 wherein said resin is one of the group of materials which consists of foamable PVC and foamable urethanes.

3. The foam strip of claim 1 wherein said smooth surfaced object is a glass laboratory equipment piece.

4. The foam strip of claim 1 wherein said tackified layer includes no backing layer other than said release liner.

* * * * *